(12) United States Patent
Ito et al.

(10) Patent No.: US 11,256,880 B2
(45) Date of Patent: Feb. 22, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Yasuhiro Ito, Kanagawa (JP); Kazuya Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 839 days.

(21) Appl. No.: 15/913,227

(22) Filed: Mar. 6, 2018

(65) Prior Publication Data
US 2019/0087416 A1    Mar. 21, 2019

(30) Foreign Application Priority Data

Sep. 21, 2017   (JP) .............................. JP2017-181096

(51) Int. Cl.
*G06F 3/048*   (2013.01)
*G06F 40/58*   (2020.01)
(Continued)

(52) U.S. Cl.
CPC ............ *G06F 40/58* (2020.01); *G06F 3/0484* (2013.01); *G06F 40/169* (2020.01)

(58) Field of Classification Search
CPC ........ G06F 3/167; G06F 3/017; G06F 3/0304; G06F 3/16; G06F 3/016
See application file for complete search history.

(56) References Cited

U.S. PATENT DOCUMENTS

| | | | | |
|---|---|---|---|---|
| 7,974,831 B2 * | 7/2011 | Kamatani | ............... | G06F 40/55 704/4 |
| 2002/0007383 A1 * | 1/2002 | Yoden | ................... | G06F 40/143 715/205 |

(Continued)

FOREIGN PATENT DOCUMENTS

| | | |
|---|---|---|
| JP | 2004-220416 A | 8/2004 |
| JP | 2006-277103 A | 10/2006 |

(Continued)

OTHER PUBLICATIONS

Sohn et al., MC-BERT4HATE: Hate Speech Detection using Multi-channel BERT for Different Languages and Translations; ©2019; IEEE; 9 pages.*

(Continued)

*Primary Examiner* — Linh K Pham
(74) *Attorney, Agent, or Firm* — Oliff PLC

(57) ABSTRACT

An information processing apparatus includes a receiving unit, a first acquisition unit, a second acquisition unit, a third acquisition unit, and an addition unit. The receiving unit receives a translation source document. The first acquisition unit acquires a first language that is a language used in the document. The second acquisition unit acquires a second language that is a translation target language. The third acquisition unit acquires, on the basis of a peculiar expression in the document, the first language, and the second language, supplementary information that explains the peculiar expression in the second language. The addition unit adds the supplementary information to a translation result of the document.

11 Claims, 11 Drawing Sheets

(51) Int. Cl.
*G06F 3/0484* (2022.01)
*G06F 40/169* (2020.01)

(56) References Cited

U.S. PATENT DOCUMENTS

| | | | |
|---|---|---|---|
| 2004/0205671 A1* | 10/2004 | Sukehiro | G06F 40/242 715/259 |
| 2004/0243391 A1* | 12/2004 | Nelson | G06F 16/40 704/2 |
| 2006/0217964 A1* | 9/2006 | Kamatani | G06F 40/55 704/7 |
| 2006/0224378 A1 | 10/2006 | Chino et al. | |
| 2006/0293876 A1* | 12/2006 | Kamatani | G06F 40/40 704/2 |
| 2010/0070265 A1* | 3/2010 | Nelson | G06F 40/58 704/8 |
| 2011/0231792 A1* | 9/2011 | Tan | G06F 3/017 715/810 |
| 2011/0307241 A1* | 12/2011 | Waibel | G10L 15/06 704/2 |
| 2012/0016655 A1* | 1/2012 | Travieso | G06F 40/55 704/2 |
| 2012/0117461 A1* | 5/2012 | Sata | G06F 40/169 715/243 |
| 2013/0151230 A1* | 6/2013 | Chu | G06F 40/47 704/2 |
| 2014/0358518 A1* | 12/2014 | Wu | G06F 40/58 704/3 |
| 2015/0199340 A1* | 7/2015 | Kwon | G06F 40/35 704/2 |
| 2016/0133154 A1* | 5/2016 | Cortes | G09B 5/065 434/157 |
| 2016/0147746 A1* | 5/2016 | Park | G06F 40/40 704/7 |
| 2016/0162478 A1* | 6/2016 | Blassin | G06Q 10/06311 706/12 |
| 2017/0140563 A1* | 5/2017 | No | H04N 1/00198 |
| 2018/0095949 A1* | 4/2018 | Lewis | G06F 16/248 |

FOREIGN PATENT DOCUMENTS

| | | |
|---|---|---|
| JP | 2006-277119 A | 10/2006 |
| JP | 2006-277677 A | 10/2006 |

OTHER PUBLICATIONS

Hu et al., Towards a Context-Free Machine Universal Grammar (CF-MUG) in Natural Language Processing; 2020; IEEE;19 pages.*
Jul. 6, 2021 Office Action issued in Japanese Patent Application No. 2017-181096.

* cited by examiner

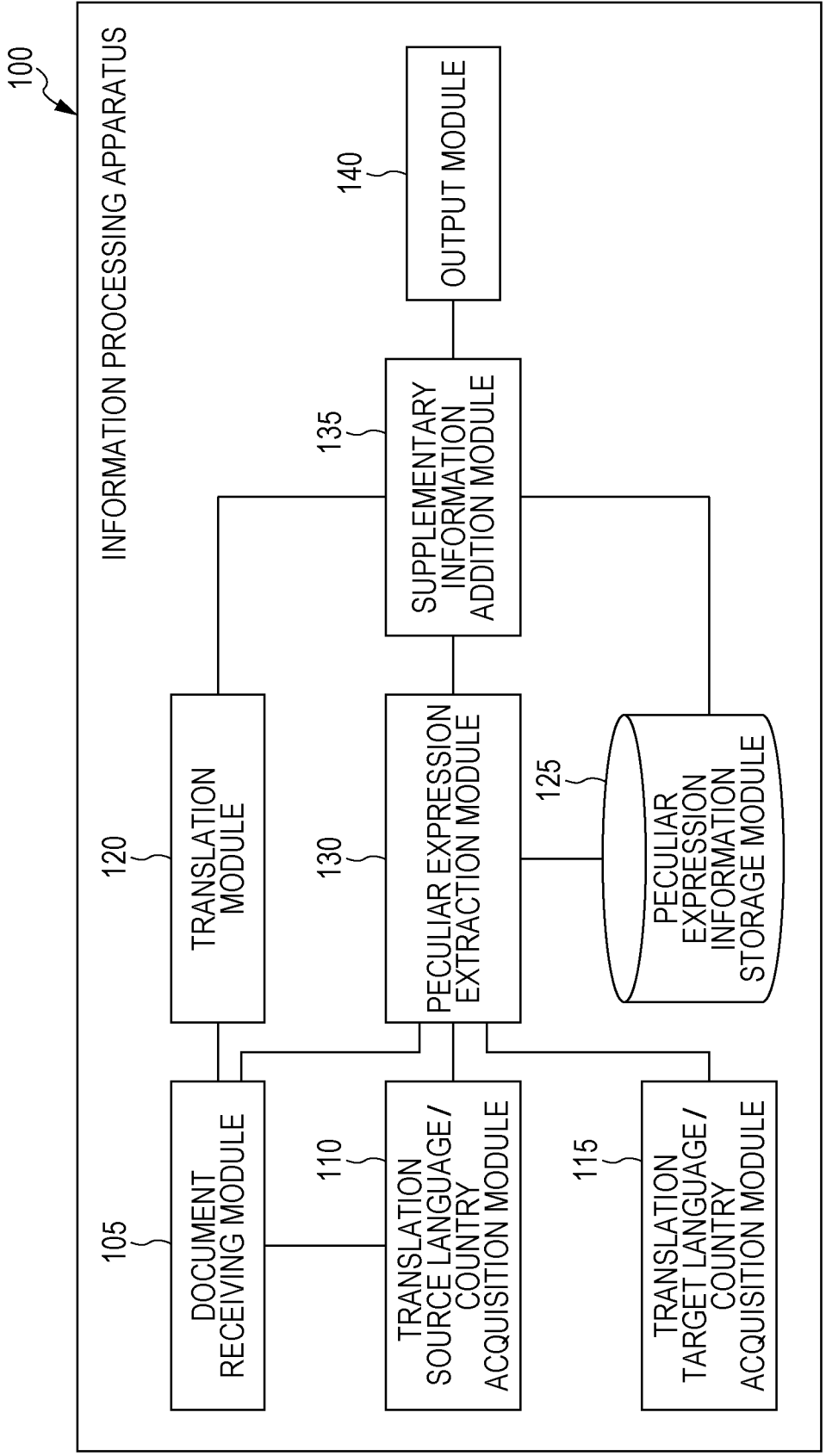

FIG. 5

| | | | | 500 |
|---|---|---|---|---|
| 510 — PROFILE | no1 | no2 | no3 | |
| 520 — AGE | 50 | 30 | 24 | |
| 530 — ADDRESS | 220-8668<br>神奈川県・・・ | xxx-xxx | zzz-zzz | |
| 540 — NAME | 富士 太郎 | us taro | AU taro | |
| 550 — COUNTRY | 日本 | US | Australia | |
| | ... | ... | ... | ... |

FIG. 6

| 610 | 620 | 630 | 640 |
|---|---|---|---|
| PECULIAR EXPRESSION ID | JP | AU | US |
| 1 | 小さじ1 | 1 teaspoon | 1 teaspoon |
| 2 | 大さじ1 | 1 tablespoon | 1 tablespoon |
| 3 | 1カップ | 1 cup | 1 cup |

FIG. 7

| 710 | 720 | 730 | 740 |
|---|---|---|---|
| PECULIAR EXPRESSION ID | US Metric | JP Metric | AU Metric |
| 1 | 5 ml | 5 ml | 5 ml |
| 2 | 15 ml | 15 ml | 20 ml |
| 3 | 240 ml | 200 ml | 240 ml |

FIG. 11

| PECULIAR EXPRESSION | JP | US | China |
|---|---|---|---|
| 13階 | ○ | × In Japan "13th floor" is not use as an unfortunate figure | ○ |
| 404号室 | × アメリカでは「404号室」は不幸な数字としては使われていません | ○ | × 在美国，"404号办公室"不被用作一个不幸的数目 |

| | JP | ID | UAE |
|---|---|---|---|
| SIMMERED FISH | ○ | ✕ Cooking alcohol may be used.. | ✕ Confirmation of halal certification is required |
| | | | |

1310, 1320, 1330, 1340, 1300

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-181096 filed Sep. 21, 2017.

BACKGROUND

Technical Field

The present invention relates to an information processing apparatus and a non-transitory computer readable medium.

SUMMARY

According to an aspect of the present invention, there is provided an information processing apparatus including: a receiving unit that receives a translation source document; a first acquisition unit that acquires a first language that is a language used in the document; a second acquisition unit that acquires a second language that is a translation target language; a third acquisition unit that acquires, on a basis of a peculiar expression in the document, the first language, and the second language, supplementary information that explains the peculiar expression in the second language; and an addition unit that adds the supplementary information to a translation result of the document.

BRIEF DESCRIPTION OF THE DRAWINGS

An exemplary embodiment of the present invention will be described in detail based on the following figures, wherein:

FIG. 1 is a conceptual module configuration diagram illustrating a configuration example of an exemplary embodiment;

FIG. 5 illustrates a data structure example of a user profile table;

FIG. 6 illustrates a data structure example of a specific expression translation/replacement table;

FIG. 7 illustrates a data structure example of a unit conversion table;

FIG. 11 illustrates a data structure example of a culture supplementation table;

DETAILED DESCRIPTION

Figure 2A:
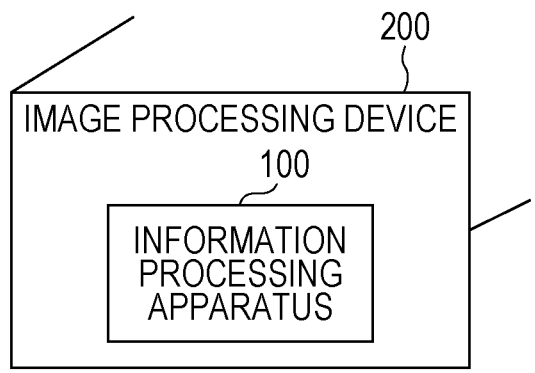
FIGS. 2A and 2B illustrate system configuration examples that utilize the exemplary embodiment.

A preferable exemplary embodiment for implementing the present invention will be described below with reference to the drawings.

FIG. 1 is a conceptual module configuration diagram illustrating a configuration example of an exemplary embodiment.

The term "module" generally refers to parts such as software (computer program) and hardware that are logically separable from each other. Thus, the modules in the exemplary embodiment include not only modules based on computer programs but also modules based on hardware components. Therefore, the exemplary embodiment also describes a computer program for causing a computer to function as such modules (a program for causing a computer to execute such procedures, a program for causing a computer to function as such units, and a program for causing a computer to implement such functions), a system, and a method. It should be noted, however, that language "store" and "cause . . . to store" and equivalent language is used for convenience of description. In the case where the exemplary embodiment describes a computer program, however, such language means to "cause a storage device to store" or "perform control so as to cause a storage device to store". In addition, the modules may make one-to-one correspondence with the functions. In implementation, however, one module may be constituted of one program, plural modules may be constituted of one program, or conversely one module may be constituted of plural programs. In addition, plural modules may be executed by one computer, or one module may be executed by plural distributed or parallel computers. One module may include another module. In the following description, in addition, the term "connection" is used to indicate not only physical connections but also logical connections (for data exchange, instruction, data reference, etc.). The term "predetermined" means that the modificand has been determined before the target process, and may be used to mean that the modificand is determined in accordance with the situation or the state at the time, or the situation or the state in the past, before the target process even after the process according to the exemplary embodiment is started, not to mention before the process according to the exemplary embodiment is started. In the case where there are plural "predetermined values", such values may be different from each other, or two or more (or all, as a matter of course) of such values may be the same as each other. In addition, the wording "in the case where A, then B" is used to mean "it is determined whether or not A, and in the case where it is determined that A, then B". It should be noted, however, that cases where it is not necessary to determine whether or not A are excluded. In the case where elements are listed as in "A, B, and C", such listing is exemplary unless stated otherwise, and includes a case where only one of the elements (e.g. A alone) is selected.

In addition, the system or the device may be constituted of plural computers, hardware, devices, etc. connected by a communication unit such as a network (including a one-to-one communication connection), or may be implemented by one computer, hardware, device, etc. The terms "device" and "system" are used as synonyms for each other. As a matter of course, the term "system" does not include mere social "schemes" (social systems) which are artificial arrangements.

In addition, after each process performed by each module, or after each of plural processes performed in a module, target information is read from a storage device, and the result of the process is written into the storage device after the process is performed. Thus, reading from the storage device before the process and writing into the storage device after the process may not be described. Examples of the storage device may include a hard disk, a random access memory (RAM), an external storage medium, a storage device via a communication line, and a register in a central processing unit (CPU).

An information processing apparatus 100 according to the exemplary embodiment performs a translation process. As illustrated in FIG. 1, the information processing apparatus 100 includes a document receiving module 105, a translation source language/country acquisition module 110, a translation target language/country acquisition module 115, a translation module 120, a peculiar expression information storage module 125, a peculiar expression extraction module 130, a supplementary information addition module 135, and an output module 140. The information processing apparatus 100 outputs a translation result and supplementary information. The supplementary information is an explanation for the translation result, and may include the meaning of the background of the translation result, notices, etc. More specifically, the information processing apparatus 100 adds supplementary information when translating a document that may cause a discrepancy in understanding with the translation result alone. That is, supplementary information is added in order to suppress occurrence of misunderstanding in the case where there is a possibility of occurrence of misunderstanding in a person who utilizes the translation result even if the translation result itself is correct.

The document receiving module 105 is connected to the translation source language/country acquisition module 110, the translation module 120, and the peculiar expression extraction module 130. The document receiving module 105 receives a translation source document, and delivers the document to the translation source language/country acquisition module 110, the translation module 120, and the peculiar expression extraction module 130. A document (also referred to as a "file") contains at least text data, and may contain numerical data, figure data, image data, movie data, sound data, etc., and a combination of such data. The document may be stored, edited, searched for, etc., and may be exchanged as an individual unit between systems or users. The document may include objects with similar properties. Specifically, the document includes a document prepared by a document preparation program, an image read by an image reading device (such as a scanner and a camera), a web page, etc. In the case where an image read by an image reading device is received, a character recognition process may be performed to convert character images into text data.

"Receiving a document" includes, for example, reading a document stored in a storage medium (such as a hard disk built in a computer or connected via a network, for example), reading an image using an image reading device, receiving an image from an external device via a communication line through facsimile or the like, etc. A single document or plural documents may be received. The document may be a business document, a cooking recipe, a travel guide, an advertisement pamphlet, etc.

The translation source language/country acquisition module 110 is connected to the document receiving module 105 and the peculiar expression extraction module 130. The translation source language/country acquisition module 110 acquires a first language that is a language used in the document which is received by the document receiving module 105, and delivers the first language to the peculiar expression extraction module 130. For example, the language may be determined from the character code of characters used in the document, or may be selected (or input) by the user. In the case where only documents in a predetermined language are acquired, the predetermined language may be acquired.

The translation source language/country acquisition module 110 may further acquire a first country or region in which the document has been prepared, together with the first language. For example, a table in which languages and countries or regions are correlated with each other may be prepared so that the country or region is acquired from the language. In the case where the country or region in which the document has been prepared is included as an attribute of the document, the country or region may be acquired from the attribute. The country or region may be selected (or input) by the user. In the case where only documents prepared in a predetermined country or region are acquired, the predetermined country or region may be acquired. The country or region of a user who prepared the document may be acquired from the profile of the user in a social networking service (SNS). In addition, the country or region may be construed as suggesting nationality, address, whereabouts, etc. Further, religion, ethnic group, etc. may be acquired from the country or region. For example, a table in which countries or regions and religions, ethnic groups, etc. are correlated with each other may be prepared so that the religion, the ethnic group, etc. are acquired from the country or region.

The translation target language/country acquisition module 115 is connected to the peculiar expression extraction module 130. The translation target language/country acquisition module 115 acquires a second language as the translation target language, and delivers the second language to the peculiar expression extraction module 130. For example, the language may be selected by the user. In the case where documents are translated into only a predetermined language, the predetermined language may be acquired. The language of a user who utilizes the document may be acquired from the profile of the user in an SNS.

Further, the translation target language/country acquisition module 115 may acquire a second country or region in which the translation result of the document is used, together with the second language. For example, a table in which languages and countries or regions are correlated with each other may be prepared so that the country or region is acquired from the language. The country or region may be selected (or input) by the user. In the case where documents are translated into only a predetermined language, the country or region in which the predetermined language is used may be acquired. The country or region of a user who utilizes the document may be acquired from the profile of the user in an SNS. In addition, the country or region may be construed as suggesting nationality, address, whereabouts, etc. Further, religion, ethnic group, etc. may be acquired from the country or region. For example, a table in which countries or regions and religions, ethnic groups, etc. are correlated with each other may be prepared so that the religion, the ethnic group, etc. are acquired from the country or region.

The translation module 120 is connected to the document receiving module 105 and the supplementary information addition module 135. The translation module 120 translates the document which is received by the document receiving module 105 into the second language (as the translation target language which is acquired by the translation target language/country acquisition module 115). The existing translation techniques may be used. Here, translation is performed from the first language into the second language.

The peculiar expression information storage module 125 is connected to the peculiar expression extraction module 130 and the supplementary information addition module 135. The peculiar expression information storage module 125 stores peculiar expressions and supplementary information corresponding to the peculiar expressions. For example, the peculiar expression information storage module 125 stores a peculiar expression translation/replacement table 600, a unit conversion table 700, a uniform resource locator (URL) replacement process table 900, a culture supplementation table 1100, a culture supplementation table 1300, etc. The peculiar expression information storage module 125 is accessed by the peculiar expression extraction module 130 to be utilized to extract peculiar expressions, and accessed by the supplementary information addition module 135 to be utilized to add supplementary information.

The peculiar expression extraction module 130 is connected to the document receiving module 105, the translation source language/country acquisition module 110, the translation target language/country acquisition module 115, the peculiar expression information storage module 125, and the supplementary information addition module 135. The peculiar expression extraction module 130 extracts peculiar expressions from the document which is received by the document receiving module 105. Specifically, the peculiar expression extraction module 130 may inspect whether or not expressions (including a word and plural words) in the document correspond to peculiar expressions in the peculiar expression information storage module 125.

In addition, the peculiar expression extraction module 130 may extract peculiar expressions from the translation result of the document (the document after being translated by the translation module 120). Here, the translation result is a result (document) obtained by translating the source document into the second language. As a matter of course, the second language is used in the document as the translation result.

The peculiar expressions here are expressions that have different meanings when used in the first language and when used in the second language. The "meanings when used in the first language and when used in the second language" include traditional meanings (including habitual, cultural, folk, customary, and religious meanings, etc.). For example, a figure "13", which has the same meaning as a figure in any language, is used merely as a number in some languages (e.g. Japanese), but is traditionally treated as a tabooed number in other languages (e.g. English, which is principally used in the Christian society). In this case, misunderstanding among users may be avoided by providing a reason for adding the supplementary information in the first place.

To be exact, the difference discussed earlier occurs from religious differences (whether or not the user is a Christian). In the case where many of the people who use a certain language believe in a particular religion, however, the determination may be made on the basis of the language alone.

The peculiar expression extraction module 130 may extract peculiar expressions using a table that stores predetermined peculiar expressions. For example, a table that stores peculiar expressions in correspondence with combinations of the first language and the second language may be used.

Further, the peculiar expression extraction module 130 may acquire supplementary information that explains a peculiar expression in the second language on the basis of the peculiar expression, the first language, the first country or region, the second language, and the second country or region. The peculiar expressions here are expressions that have different meanings when used in the first country or region and when used in the second country or region. The expressions with different meanings may include expressions with different meanings among religions, ethnic groups, etc.

The peculiar expressions may further include URLs that are considered to be inaccessible from the second country or region.

The supplementary information addition module 135 is connected to the translation module 120, the peculiar expression information storage module 125, the peculiar expression extraction module 130, and the output module 140. The supplementary information addition module 135 acquires, on the basis of a peculiar expression, the first language, and the second language, supplementary information that explains the peculiar expression in the second language from the peculiar expression information storage module 125.

Then, the supplementary information addition module 135 adds the supplementary information to the translation result of the document.

The supplementary information may be acquired using a table that stores predetermined supplementary information. For example, a table that stores supplementary information in correspondence with combinations of the first language, the second language, and a peculiar expression may be used.

The supplementary information may include an explanation for different meanings (including a reason for adding the supplementary information, for example).

In addition, the supplementary information may include an explanation for traditional differences among countries or regions.

In addition, the supplementary information addition module 135 may add the supplementary information to the translation result as a ruby or a caution. The "ruby" refers to small characters disposed near a peculiar expression. The ruby is used to describe the supplementary information, while it is generally used to indicate how letters should be read. The caution is provided in a predetermined area (such as the bottom of a page on which a peculiar expression is used or the final page, for example), a rectangular area, etc. of the document as the translation result. It is only necessary that the caution should correspond to a peculiar expression. For example, a number may be added to a peculiar expression as a ruby, and a caution may be provided with the number.

The supplementary information addition module 135 may provide characters of the supplementary information in a different form (shape, pattern, color, dynamic variations (such as flashing or animation, for example), blinking (in changeable manners as to whether or not the characters blink, the period of blinking, the intervals of blinking, etc.), and a combination thereof) from characters of the translation result other than at least peculiar expressions. Examples of the different form include a reduced character size, a red character color, blinked characters, etc.

The translation results of the peculiar expressions may be provided in the same form as or in a different form from the translation results of the others (the translation results of portions other than the peculiar expressions). If the translation results of the peculiar expressions are provided in a different form, the users may grasp the presence of supplementary information easily.

The output module 140 is connected to the supplementary information addition module 135. The output module 140 outputs a translation result (document) to which supplementary information has been added by the supplementary information addition module 135. "Outputting a document" includes, for example, printing the document using a printing device such as a printer, displaying the document on a display device such as a display, transmitting an image using an image transmission device such as a facsimile, writing the document into a document storage device such as a document database, storing the document in a storage medium such as a memory card, delivering the document to another information processing apparatus (such as via an electronic mail), etc.

FIG. 2 illustrates a system configuration example that utilizes the exemplary embodiment.

An image processing device 200 illustrated in the example of FIG. 2A includes the information processing apparatus 100. The image processing device 200 is a multi-function device (an image processing device that has the functions of two or more of a scanner, a printer, a copier, a facsimile, etc.), for example, and recognizes characters in a document read by a scanner, translates the document, and prints the translation result including supplementary information using a printer. In the printed document, the translation result may be disposed while maintaining the layout of the document which has been scanned.

Figure 2B:
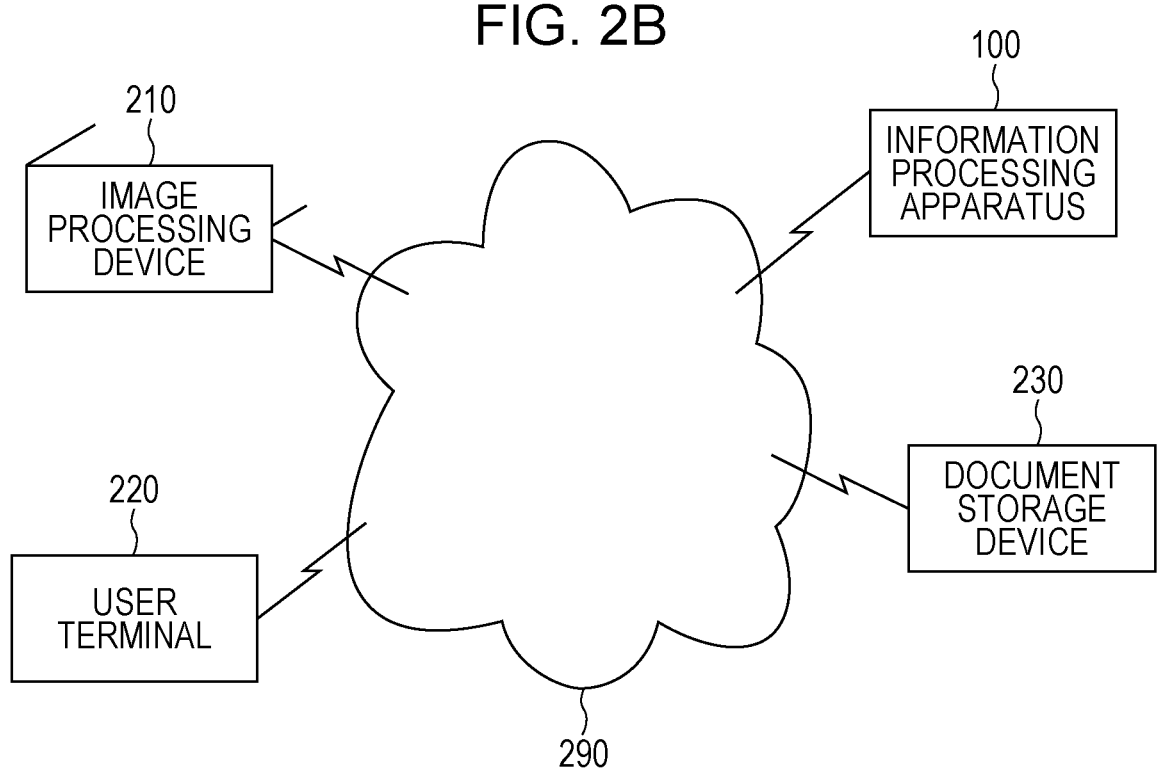

In the system illustrated in the example of FIG. 2B, the information processing apparatus 100, an image processing device 210, a user terminal 220, and a document storage device 230 that serves as a document repository are connected to each other via a communication line 290. The communication line 290 may be wireless, wired, or a combination of both, and may be the Internet, an intranet, etc. that serves as a communication infrastructure, for example. The functions of the information processing apparatus 100 and the document storage device 230 may be implemented as cloud services.

For example, the image processing device 210 may read a document, transmit a document image to the information processing apparatus 100, and receive from the information processing apparatus 100 and print a translated document (translation result including supplementary information). In response to an operation by the user of the user terminal 220, alternatively, an electronic document in the user terminal 220 or the document storage device 230 may be transmitted to the information processing apparatus 100, and a translated document (translation result including supplementary information) may be received from the information processing apparatus 100. After that, the translated document may be printed by the image processing device 210, or may be stored in the document storage device 230.

Figure 3:
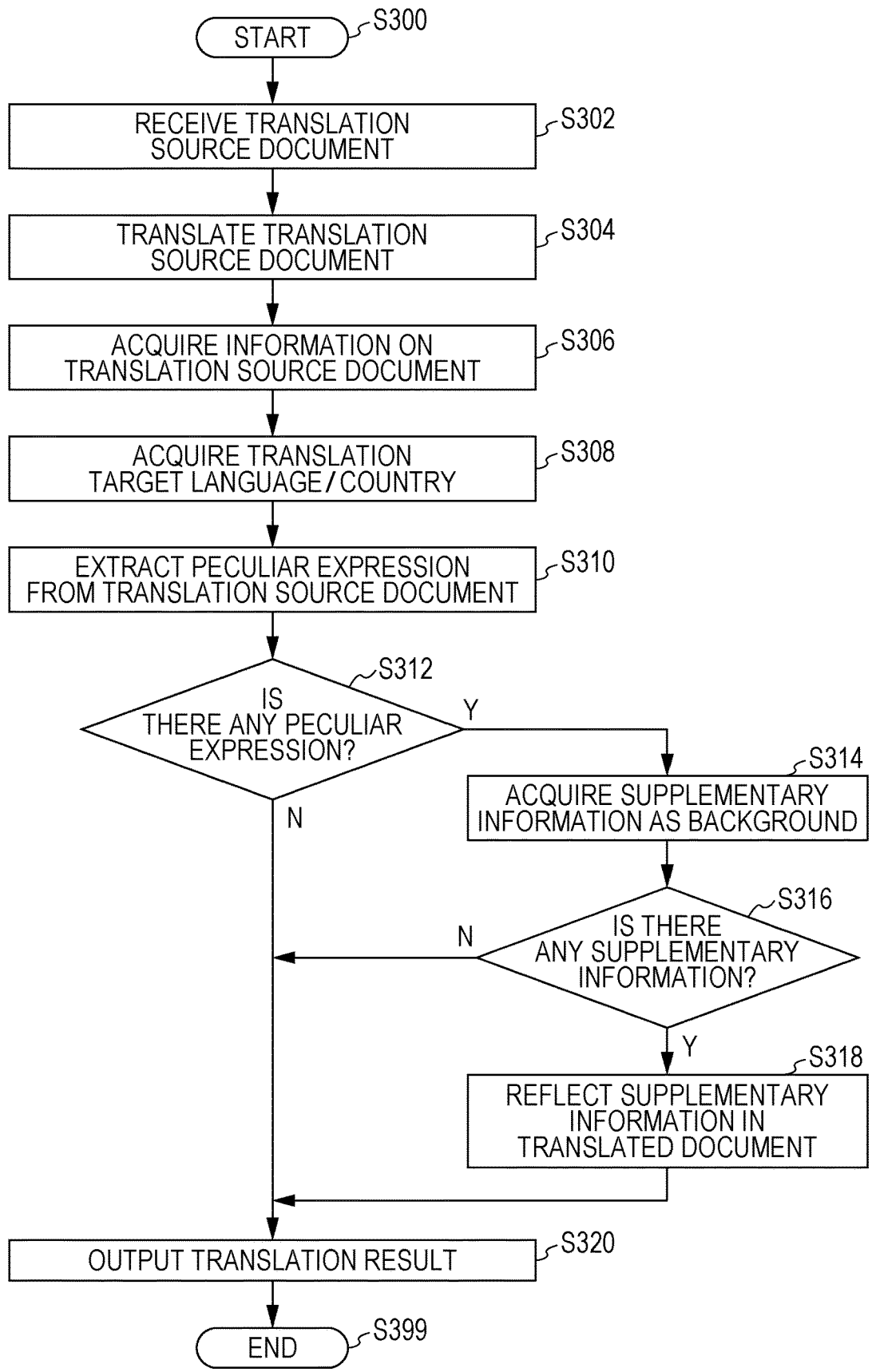
FIG. 3 is a flowchart illustrating a process example according to the exemplary embodiment.

FIG. 3 is a flowchart illustrating a process example according to the exemplary embodiment.

In step S302, the document receiving module 105 receives a translation source document.

In step S304, the translation module 120 translates the translation source document.

In step S306, the translation source language/country acquisition module 110 acquires information on the translation source document.

In step S308, the translation target language/country acquisition module 115 acquires a translation target language/country.

In step S310, the peculiar expression extraction module 130 extracts a peculiar expression from the translation source document.

In step S312, the peculiar expression extraction module 130 determines whether or not there is any peculiar expression. In the case where there is any peculiar expression, the process proceeds to step S314. Otherwise, the process proceeds to step S320.

In step S314, the supplementary information addition module 135 acquires supplementary information as the background.

In step S316, the supplementary information addition module 135 determines whether or not there is any supplementary information. In the case where there is any supplementary information, the process proceeds to step S318. Otherwise (in the case where there is not any supplementary information), the process proceeds to step S320.

In step S318, the supplementary information addition module 135 reflects the supplementary information in the translated document. The translation result itself is not changed.

In step S320, the output module 140 outputs the translation result.

Examples will be described below.

Figure 4:
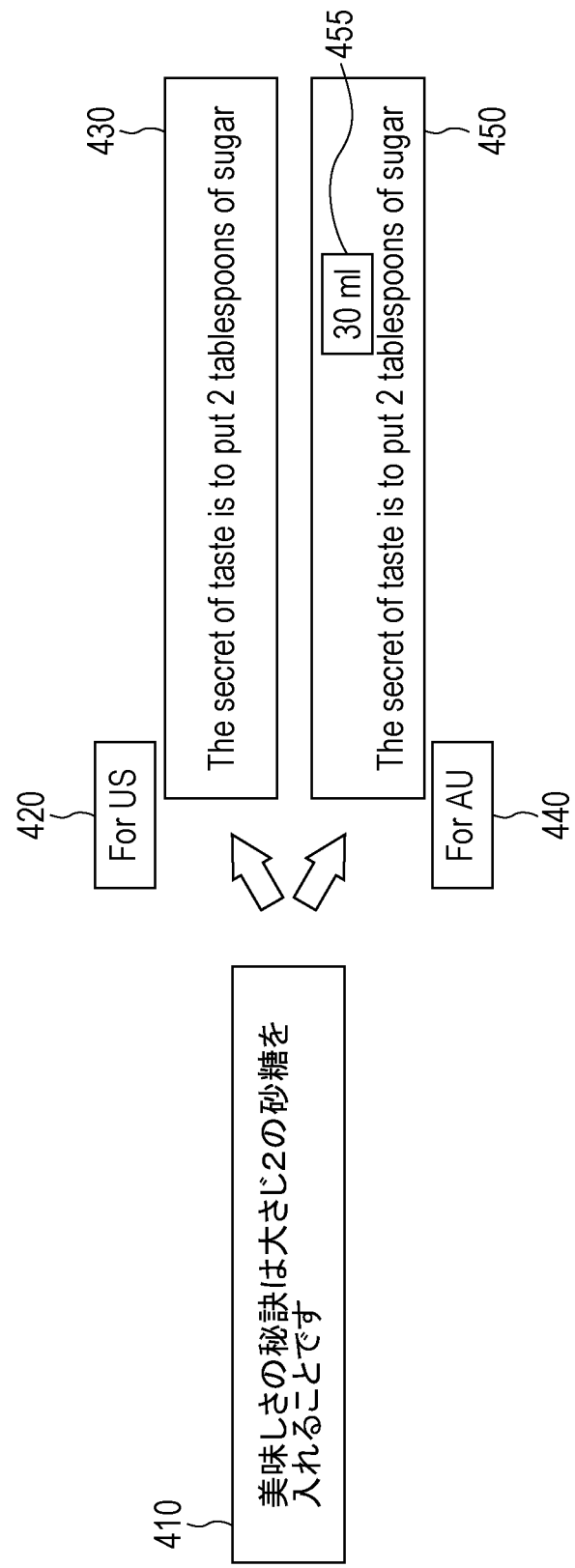
FIG. 4 illustrates a process example according to the exemplary embodiment.

FIG. 4 illustrates a process example according to the exemplary embodiment.

For example, a sentence "美味しさの 秘訣は大さじ 2 の砂糖を入れることです" is provided as a translation source sentence 410. The translation source language/country acquisition module 110 acquires, from the character code, Japanese as the translation source language and Japan as the translation module country or region. In the case where the translation target language is English and the translation target country or region is a translation target (United States) 420, the translation target language/country acquisition module 115 provides a sentence "The secret of taste is to put 2 tablespoons of sugar", for example, as a translated sentence 430.

In the case where the translation target language is English and the translation target country or region is a translation target (Australia) 440, meanwhile, the translation target language/country acquisition module 115 provides a sentence "The secret of taste is to put 2 tablespoons of sugar", for example, as a translated sentence 450.

Here, the capacity of a "大さじ" is the same (15 ml) in the United States and Japan, and thus the translated sentence 430 is used as it is as the translation result. That is, the meaning (capacity) of a "大さじ" used in Japan is the same as the meaning (capacity) of a "tablespoon" used in the United States, and thus no supplementary information is necessary.

However, the capacity of a "tablespoon" in Australia is 20 ml, which is different from that in Japan. Thus, a ruby 455 is added to the translated sentence 450 as supplementary information. The ruby 455 says "30 ml", for example, and is displayed over the word "tablespoons" in red smaller characters than those for the body sentence (translated sentence).

A process example for the translation target (Australia) 440 will be described below. The translation source sentence 410 includes expressions "大さじ" and "2". (1) The translation target language/country acquisition module 115 acquires country information "AU" from a profile. For example, a user profile table 500 of a user who utilizes the translation result is acquired from an SNS of the user. FIG. 5 illustrates a data structure example of a user profile table

500. The user profile table 500 includes a profile field 510, an age field 520, an address field 530, a name field 540, a country field 550, etc. The profile field 510 stores identification information on users. The age field 520 stores the ages of the users. The address field 530 stores the addresses of the users. The name field 540 stores the names of the users. The country field 550 stores the countries of the users. In this example, the user "no3" is the user who utilizes the translated sentence 450.

(2) The peculiar expression extraction module 130 acquires peculiar expressions using the peculiar expression translation/replacement table 600. FIG. 6 illustrates a data structure example of the peculiar expression translation/replacement table 600. The peculiar expression translation/replacement table 600 includes a peculiar expression identification (ID) field 610, a JP field 620, an AU field 630, and a US field 640. The peculiar expression ID field 610 stores information (peculiar expression ID) for uniquely identifying peculiar expressions in the exemplary embodiment. The JP field 620 stores expressions in Japan. The AU field 630 stores expressions in Australia. The US field 640 stores expressions in the United States. For example, the expression "大さじ" corresponds to "1 tablespoon" when translated for Australia, and corresponds to "1 tablespoon" when translated for the United States.

(3) The peculiar expression extraction module 130 compares the unit capacities in the original sentence (JP) and the translated sentence (AU) of the same peculiar expression ID using the unit conversion table 700. FIG. 7 illustrates a data structure example of the unit conversion table 700. The unit conversion table 700 includes a peculiar expression ID field 710, a US metric field 720, a JP metric field 730, and an AU metric field 740. The peculiar expression ID field 710 stores peculiar expression IDs. The US metric field 720 stores the unit capacities in the United States. The JP metric field 730 stores the unit capacities in Japan. The AU metric field 740 stores the unit capacities in Australia. Specifically, the JP metric field 730 (15 ml) and the AU metric field 740 (20 ml) in the second row (peculiar expression ID: 2) of the unit conversion table 700 are acquired.

(4) The unit capacities in the translated sentence (AU) and the original sentence (JP) are different from each other, and therefore the supplementary information addition module 135 adds the ruby 455 which indicates the correct capacity (30 ml) to the translated sentence 450. The "30 ml" is calculated from the "tablespoon" (15 ml) which indicates the unit capacity and "2" which indicates the quantity.

In this example, supplementary information is added in the case where peculiar expressions are provided in the peculiar expression translation/replacement table 600 and the unit capacities are different in the unit conversion table 700. However, the peculiar expression translation/replacement table 600 may be composed of peculiar expressions with different unit capacities, and it may be determined only on the basis of the peculiar expression translation/replacement table 600 whether or not to add supplementary information. Specifically, two tables, namely a table A that includes a peculiar expression ID field 610, a JP field 620, and an AU field 630 and a table B that includes a peculiar expression ID field 610, an AU field 630, and a US field 640, are prepared. A table that includes a peculiar expression ID field 610, a JP field 620, and a US field 640 is not necessary. This is because the elements have the same unit capacity.

The table A may be selected on the basis of the translation source language (or country) and the translation target language (or country), and it may be determined that supplementary information should be added, since the elements are in the table A. After that, supplementary information may be generated using the unit conversion table 700.

In the following example, the "country or region" is taken up as an example. However, the "country or region" may be read as the "language". The determination may be made on the basis of the language alone. As discussed later, use of the country or region, in addition to the language, enables the user of the translation result to select appropriate supplementary information.

Figure 8:
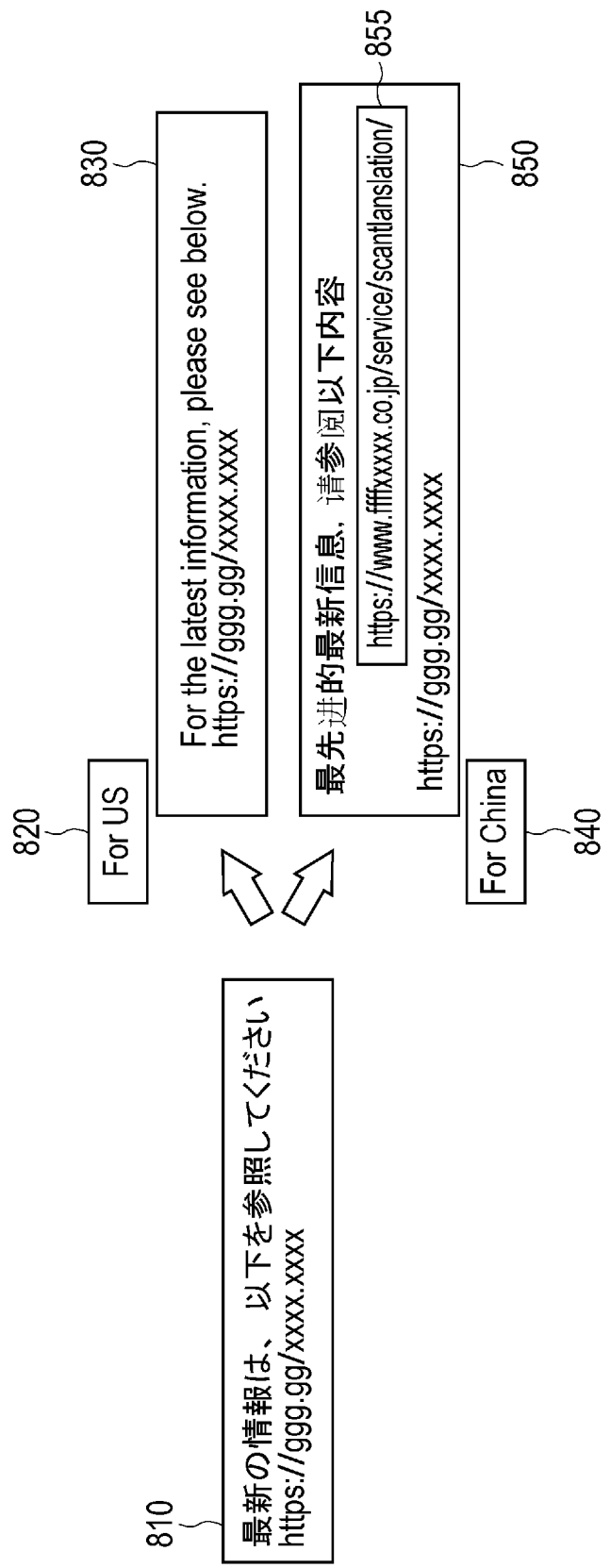
FIG. 8 illustrates a process example according to the exemplary embodiment.

FIG. 8 illustrates a process example according to the exemplary embodiment. In the case where a document is translated for a user in a country from which a URL in the document is inaccessible, an accessible URL is added as supplementary information. That is, in the case where a document contains a URL that is not easily accessible from a particular country, an accessible URL is added.

For example, a sentence "最新の情報は、以下を参照してください。https://ggg.gg/xxxx.xxxx" is provided as a translation source sentence 810.

The translation source language/country acquisition module 110 acquires, from the character code, Japanese as the translation source language and Japan as the translation module country or region.

In the case where the translation target language is English and the translation target country or region is a translation target (United States) 820, the translation target language/country acquisition module 115 provides a sentence "For the latest information, please see below. https://ggg.gg/xxxx.xxxx", for example, as a translated sentence 830.

In the case where the translation target language/country acquisition module 115 acquires Chinese as the translation target language and a translation target (China) 840 as the translation target country or region, meanwhile, a sentence "For the latest information, please see below. (Chinese) https://ggg.gg/xxxx.xxxx" is provided as a translated sentence 850. Some languages may not be expressed because of their character codes. In the following, in the case where a translated sentence contains a language name in parentheses such as "(Chinese)", it is indicated that the translated sentence is in that language.

The URL "https://ggg.gg/xxxx.xxxx" is accessible also from the United States, and thus the translated sentence 830 is provided as it is as the translation result.

However, the URL "https://ggg.gg/xxxx.xxxx" is inaccessible from China, and thus the expanded URL is also added as a ruby 855, rather than the shortened URL.

The ruby 855 says "https://www.ffffxxxxx.co.jp/service/scantlanslation/", for example, and is displayed over the original URL in red smaller characters than those for the URL in the body sentence (URL in the translated sentence).

A process example for the translation target (China) 840 will be described below. The translation source sentence 810 includes an expression of a URL "ggg.gg".

(1) The translation target language/country acquisition module 115 acquires country information "CHINA" from a profile.

Figure 9:
FIG. 9 illustrates a data structure example of a uniform resource locator (URL) replacement process table.

(2) The peculiar expression extraction module 130 references the URL replacement process table 900, and converts the URL. FIG. 9 illustrates a data structure example of the URL replacement process table 900. The URL replacement process table 900 includes a URL field 910, a JP field 920, a US field 930, and a China field 940. The URL field 910 stores URLs. The JP field 920 stores replacement processes in Japan. The US field 930 stores replacement processes in the United States. The China field 940 stores replacement processes in China.

Examples of the replacement process include "need conversion", "inaccessible", etc. In the case of "conversion needed", a URL after conversion itself may be stored, or conversion rules etc. may be stored. For example, "conversion needed" is acquired for the URL "https://ggg.gg/xxxx.xxxx", and "https://www.ffffxxxxx.co.jp/service/scantlanslation/" is acquired by converting the URL in accordance with the conversion rules.

(3) The supplementary information addition module 135 adds, to the translated sentence 850, the ruby 855 which indicates an accessible URL.

An example in which information that may not be understood in the culture of a user who uses the translation result is added as supplementary information will be described with reference to FIGS. 10 and 12. That is, supplementary information is added to an action or event that is ordinary in the country of a translation source sentence but that may not be understood in the country of a user who uses the translation result in order to suppress misunderstanding.

Figure 10:
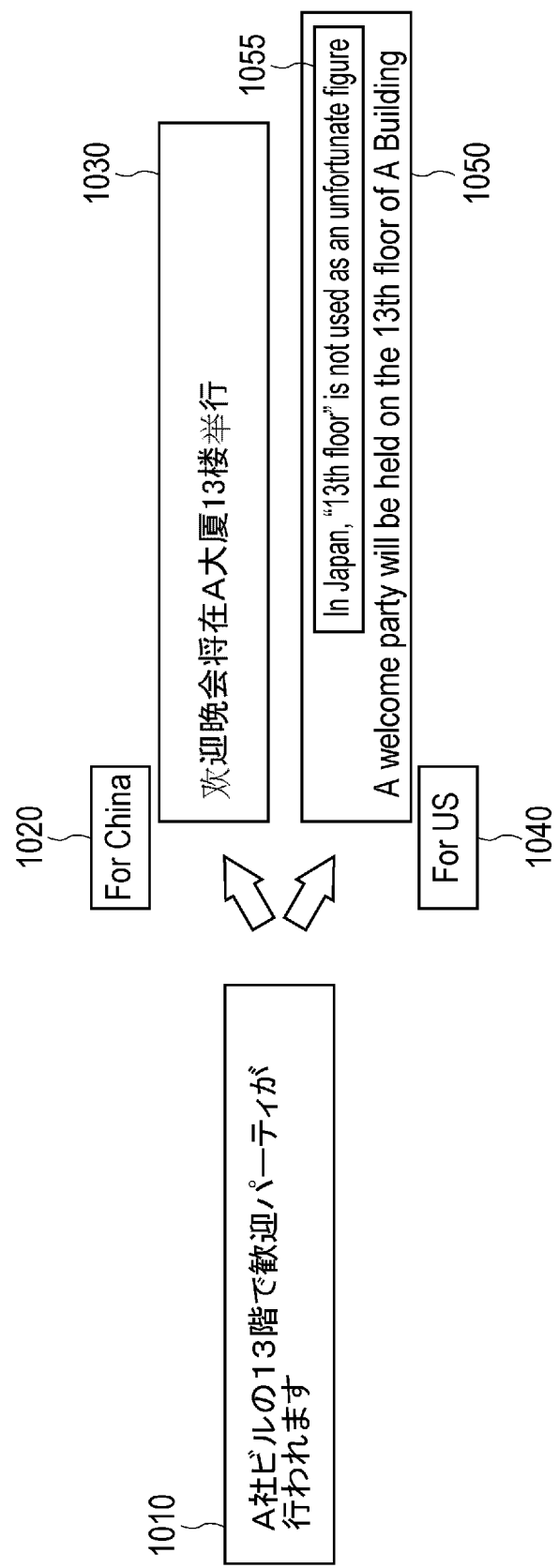
FIG. 10 illustrates a process example according to the exemplary embodiment.

FIG. 10 illustrates a process example according to the exemplary embodiment.

For example, a sentence "A 社ビルの 13 階で歓迎パーティが行われます" is provided as a translation source sentence 1010. The translation source language/country acquisition module 110 acquires, from the character code, Japanese as the translation source language and Japan as the translation module country or region. In the case where the translation target language is Chinese and the translation target country or region is a translation target (China) 1020, the translation target language/country acquisition module 115 provides a sentence "A welcome party will be held on the 13th floor of A Building (Chinese)", for example, as a translated sentence 1030.

In the case where the translation target language is English and the translation target country or region is a translation target (United States) 1040, meanwhile, the translation target language/country acquisition module 115 provides a sentence "A welcome party will be held on the 13th floor of A Building", for example, as a translated sentence 1050.

In the United States, the expression "13th floor" is generally considered to include an unfortunate number (tabooed number). A statement that says "In Japan, '13th floor' is not used as an unfortunate figure" is added as supplementary information. A ruby 1055 says "In Japan, '13th floor' is not used as an unfortunate figure.", and is displayed over the phrase "13th floor" in red smaller characters than those for the body sentence (translated sentence), for example.

A process example for the translation target (United States) 1040 will be described below. The translation source sentence 1010 includes an expression "13階".

(1) The translation target language/country acquisition module 115 acquires country information "US" from a profile.

(2) The peculiar expression extraction module 130 references the culture supplementation table 1100, and acquires supplementary information. FIG. 11 illustrates a data structure example of the culture supplementation table 1100. The culture supplementation table 1100 includes a peculiar expression field 1110, a JP field 1120, a US field 1130, and a China field 1140. The peculiar expression field 1110 stores peculiar expressions. The JP field 1120 stores supplementary information for Japan as the translation target. The US field 1130 stores supplementary information for the United States as the translation target. The China field 1140 stores supplementary information for China as the translation target. The circular mark indicates that use of the peculiar expression in the country does not mean anything other than the meaning of the peculiar expression itself. The cross mark indicates that use of the peculiar expression in the country means something other than its meaning (such as something unfortunate). For example, the expression "404 号室" includes a number that is tabooed in Japan, and thus is often avoided. In the United States, however, the expression does not have such a meaning, and thus supplementary information that says " アメリカでは「404 号室」は不幸な 数字としては使わ れていません。" is stored.

(3) The supplementary information addition module 135 adds, to the translated sentence 1050, the ruby 1055 which indicates a notice.

Figure 12:
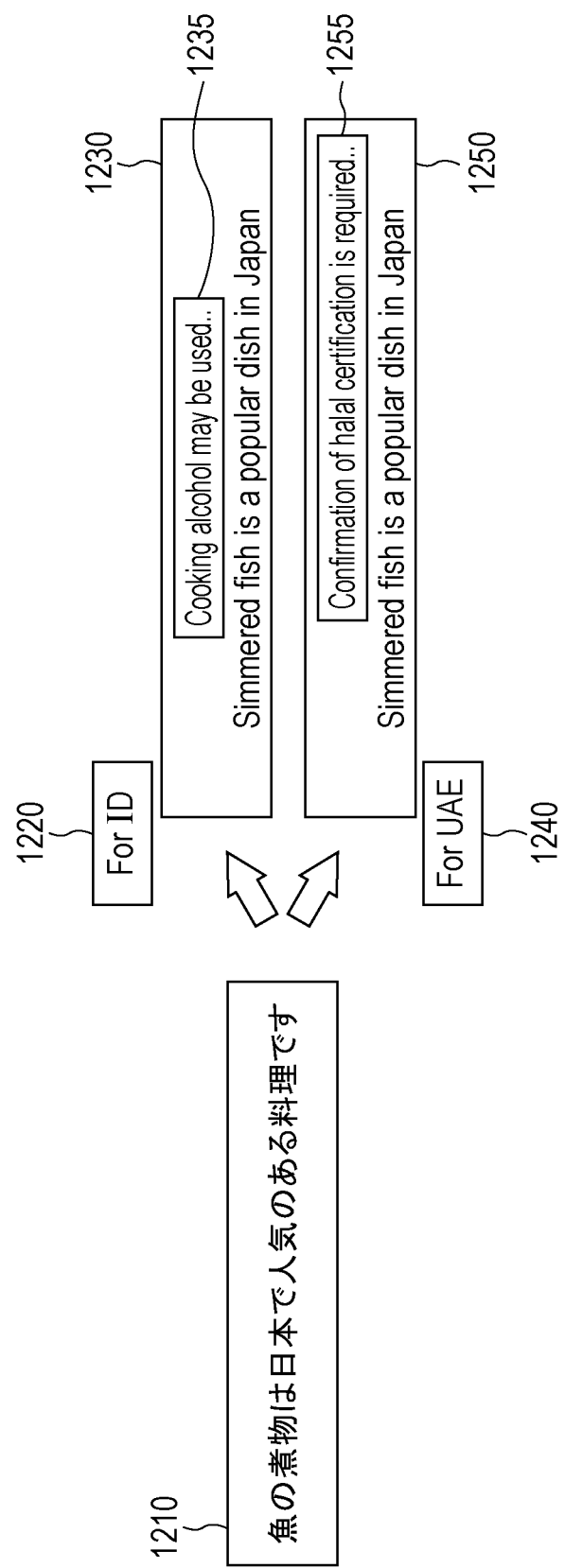
FIG. 12 illustrates a process example according to the exemplary embodiment.

FIG. 12 illustrates a process example according to the exemplary embodiment.

For example, a sentence "魚の煮物は 日本で人気の ある料理です。" is provided as a translation source sentence 1210. The translation source language/country acquisition module 110 acquires, from the character code, Japanese as the translation source language and Japan as the translation module country or region. In the case where the translation target language is Indonesian and the translation target country or region is a translation target (Indonesia) 1220, the translation target language/country acquisition module 115 provides a sentence "Simmered fish is a popular dish in Japan. (Indonesian)", for example, as a translated sentence 1230. Since cooking alcohol may be used and confirmation of halal certification is necessary, a ruby 1235 is added to the translated sentence 1230 as supplementary information. The ruby 1235 says "Cooking alcohol may be used. (Indonesian)", and is displayed over the phrase "Simmered fish (Indonesian)" in red smaller characters than those for the body sentence (translated sentence), for example.

In the case where the translation target language is Arabic and the translation target country or region is a translation target (United Arab Emirates) 1240, meanwhile, the translation target language/country acquisition module 115 provides a sentence "Simmered fish is a popular dish in Japan. (Arabic)", for example, as a translated sentence 1250. Similarly, a ruby 1255 is added to the translated sentence 1250 as supplementary information. The ruby 1255 says "Confirmation of halal certification is required. (Arabic)", and is displayed over the phrase "Simmered fish (Arabic)" in red smaller characters than those for the body sentence (translated sentence), for example.

The ruby 1235 and the ruby 1255 are different because the strictness in halal application is different among countries (or languages).

A process example for the translation target (United Arab Emirates) 1240 will be described below. The translation source sentence 1210 includes an expression "魚の煮物".

(1) The translation target language/country acquisition module 115 acquires country information "UAE" from a profile.

Figures 13, 14:
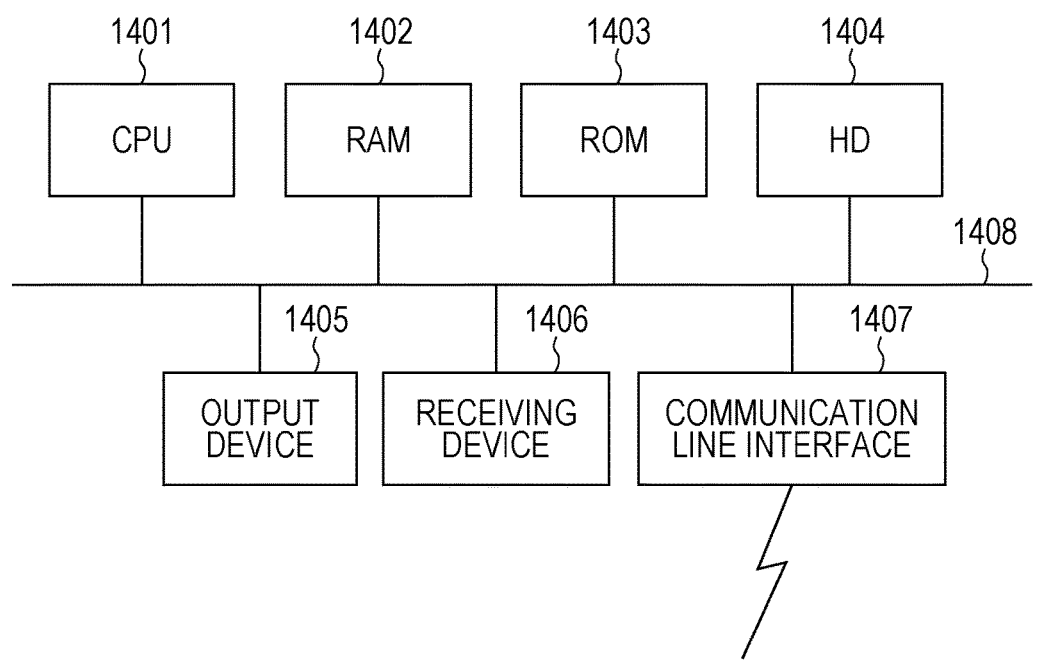
FIG. 13 illustrates a data structure example of a culture supplementation table.
FIG. 14 is a block diagram illustrating a hardware configuration example of a computer that implements the exemplary embodiment.

(2) The peculiar expression extraction module 130 references the culture supplementation table 1300, and acquires supplementary information. FIG. 13 illustrates a data structure example of the culture supplementation table 1300. The culture supplementation table 1300 includes a peculiar expression field 1310, a JP field 1320, an ID field 1330, and a UAE field 1340. The peculiar expression field 1310 stores peculiar expressions. The JP field 1320 stores supplementary information on the peculiar expression for Japan as the translation target. The ID field 1330 stores supplementary information on the peculiar expression for Indonesia as the translation target. The UAE field 1340 stores supplementary information on the peculiar expression for the United Arab Emirates as the translation target. The circular mark indicates that use of the peculiar expression in the country does not mean anything other than the meaning of the peculiar expression itself. The cross mark indicates that use of the peculiar expression in the country means something other than its meaning (such as a caution, e.g. confirmation of halal certification is necessary etc.). For example, supplementary information that says "Confirmation of halal certification is required (Arabic)" is stored.

(3) The supplementary information addition module 135 adds, to the translated sentence 1250, the ruby 1255 which indicates a notice.

As illustrated in FIG. 14, the hardware configuration of a computer that executes a program as the exemplary embodiment is a common computer, specifically a computer that may serve as a personal computer, a server, or the like. That is, as a specific example, the computer includes a CPU 1401 as a processing section (computation section) and a RAM 1402, a read only memory (ROM) 1403, and a hard disk (HD) 1404 as storage devices. The HD 1404 may be a hard disk drive or a solid state drive (SSD), for example. The computer is composed of: the CPU 1401 which executes programs such as the document receiving module 105, the translation source language/country acquisition module 110, the translation target language/country acquisition module 115, the translation module 120, the peculiar expression extraction module 130, the supplementary information addition module 135, and the output module 140; the RAM 1402 which stores the programs and data; the ROM 1403 which stores a program for starting the computer etc.; the HD 1404 which is an auxiliary storage device (which may be a flash memory or the like) that has the function as the peculiar expression information storage module 125; a reception device 1406 that receives data on the basis of an operation (including motion, a voice, a line of sight, etc.) performed by the user on a keyboard, a mouse, a touch screen, a microphone, a camera (including a line-of-sight detection camera etc.), or the like; an output device 1405 such as a CRT, a liquid crystal display, a speaker, etc.; a communication line interface 1407 for connection with a communication network such as a network interface card; and a bus 1408 that connects such components for data exchange. Plural computers may be connected to each other through a network.

The exemplary embodiment discussed earlier implemented by a computer program is implemented by causing a system of the hardware configuration described above to read the computer program as software and causing the software and hardware resources to cooperate with each other.

The hardware configuration illustrated in FIG. 14 indicates one configuration example. The exemplary embodiment is not limited to the configuration illustrated in FIG. 14, and may have any configuration that may execute the modules described in relation to the exemplary embodiment. For example, some of the modules may be constituted by dedicated hardware (such as an application specific integrated circuit (ASIC), for example), some of the modules may be provided in an external system and connected through a communication line, and further plural systems illustrated in FIG. 14 may be connected to each other through a communication line to cooperate with each other. In addition, and in particular, the system may be incorporated into not only a personal computer but also a portable information communication device (including a cellular phone, a smartphone, a mobile device, a wearable computer, etc.), an information appliance, a robot, a copier, a facsimile, a scanner, a printer, a multi-function device (image processing device that has the functions of two or more of a scanner, a printer, a copier, a facsimile, etc.), etc.

Examples of the expression with different meanings when used in the first language (or country or region) and when used in the second language (or country or region) may include, in addition to those discussed earlier, how to call hotel floors, how to catch a taxi (in particular, how to catch a taxi in Greece), cautions of sightseeing information, etc.

The program described above may be provided as stored in a storage medium, or the program may be provided by a communication unit. In this case, the program described above may be considered as an invention of a "computer-readable storage medium that stores a program", for example.

The term "computer-readable storage medium that stores a program" refers to a computer-readable storage medium that stores a program and that is used to install, execute, and distribute the program.

Examples of the storage medium include digital versatile discs (DVDs) that conform to standards prescribed by the DVD Forum "DVD-R, DVD-RW, DVD-RAM, etc.", DVDs that conform to standards prescribed by the DVD+RW Alliance "DVD+R, DVD+RW, etc.", compact discs (CDs) such as read-only memory (CD-ROM), CD recordable (CD-R), and CD rewritable (CD-RW), Blu-ray (registered trademark) discs, magneto-optical (MO) disks, flexible disks (FDs), magnetic tapes, hard disks, read-only memories (ROMs), electrically erasable reprogrammable read-only memories (EEPROMs (registered trademark)), flash memories, random-access memories (RAMs), and SD (Secure Digital) memory cards.

A part or all of the program described above may be saved, distributed, etc. as stored in the storage medium. In addition, a part or all of the program may be transferred through communication using a transfer medium such as a wired network, a wireless communication network, or a combination thereof used as a local area network (LAN), a metropolitan area network (MAN), a wide area network (WAN), the Internet, an intranet, an extranet, or the like, or may be carried over a carrier wave.

Further, the program described above may be a part or all of another program, or may be stored in a storage medium together with another program. Alternatively, the program may be stored as divided in plural storage media. In addition, the program may be compressed, encrypted, or stored in any form as long as the program may be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programed to
receive a translation source document;
acquire a first language that is a language used in the translation source document;

acquire a second language that is a translation target language;

translate the translation source document into the translation target language to create a translated source document;

extract a first expression from the translated source document, the first expression being an expression that has different meanings when used in a first country or region and when used in a second country or region;

automatically acquire, on a basis of (i) the extracted first expression, (ii) the first language, and (iii) the second language, supplementary information that explains the first expression in the second language, the supplementary information including an explanation for traditional differences between the first and second countries or regions; and automatically add the supplementary information to the translated source document.

2. The information processing apparatus according to claim 1,
wherein the first expression is an expression that has different meanings when used in the first language and when used in the second language.

3. The information processing apparatus according to claim 2,
wherein the supplementary information includes an explanation for the different meanings.

4. The information processing apparatus according to claim 1,
wherein the processor
acquires the first country or region together with the first language, wherein the translation source document has been prepared in the first country or region,
acquires the second country or region together with the second language, wherein the translated source document is used in the second country or region, and
acquires the supplementary information, wherein the supplementary information explains the first expression in the second language on a basis of the first expression, the first language, the first country or region, the second language, and the second country or region.

5. The information processing apparatus according to claim 4,
wherein the first expression includes a uniform resource locator (URL) that is considered to be inaccessible from the second country or region.

6. The information processing apparatus according to claim 5,
wherein the processor provides characters of the supplementary information in a different form from characters of the translated source document other than at least the first expression.

7. The information processing apparatus according to claim 1,
wherein the first expression includes a uniform resource locator (URL) that is considered to be inaccessible from the second country or region.

8. The information processing apparatus according to claim 7,
wherein the processor provides characters of the supplementary information in a different form from characters of the translated source document other than at least the first expression.

9. The information processing apparatus according to claim 1,
wherein the processor adds the supplementary information to the translated source document as a ruby or a caution.

10. A non-transitory computer readable medium storing a program causing a computer to execute a process for information processing, the process comprising:
receiving a translation source document;
acquiring a first language that is a language used in the translation source document;
acquiring a second language that is a translation target language;
translating the translation source document into the translation target language to create a translated source document of the translation source document;
extracting a first expression from the translated source document, the first expression being an expression that has different meanings when used in a first country or region and when used in a second country or region;
automatically acquiring, on a basis of (i) the extracted first expression, (ii) the first language, and (iii) the second language, supplementary information that explains the first expression in the second language, the supplementary information including an explanation for traditional differences between the first and second countries or regions; and
automatically adding the supplementary information to the translated source document.

11. An information processing apparatus comprising:
receiving means that receives a translation source document;
first acquisition means that acquires a first language that is a language used in the translation source document;
second acquisition means that acquires a second language that is a translation target language;
translation means that translates the translation source document into the translation target language to create a translated source document of the translation source document;
extracting means that extracts a first expression from the translated source document, the first expression being an expression that has different meanings when used in a first country or region and when used in a second country or region;
third acquisition means that automatically acquires, on a basis of (i) the extracted first expression, (ii) the first language, and (iii) the second language, supplementary information that explains the first expression in the second language, the supplementary information including an explanation for traditional differences between the first and second countries or regions; and
addition means that automatically adds the supplementary information to the translated source document.

* * * * *